Oct. 30, 1962 G. DIEMER 3,061,781
DEVICE FOR VISUAL INDICATION OF DIRECT VOLTAGES
Filed March 22, 1960
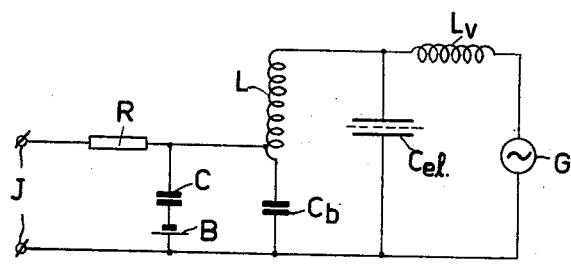
INVENTOR
GESINUS DIEMER
BY
AGENT United States Patent Office 3,061,781
Patented Oct. 30, 1962

3,061,781
DEVICE FOR VISUAL INDICATION OF DIRECT VOLTAGES
Gesinus Diemer, Eindhoven, Netherlands, assignor to North American Philips Company, Inc., New York, N.Y., a corporation of Delaware
Filed Mar. 22, 1960, Ser. No. 16,862
Claims priority, application Netherlands Apr. 24, 1959
5 Claims. (Cl. 324—96)

The invention relates to a device for visual indication of direct voltages or currents. The invention has for its object to provide a device which provides a clearly visible indication of low direct voltage or currents, without any discharge valves being employed.

Accordingly this invention features an electroluminescent device adapted for the visual indication of an electrical signal comprising a resonant circuit having an electroluminescent capacitor, inductor means coupled to the electroluminescent capacitor and a variable reactive impedance means which is coupled to the inductor and whose impedance characteristic is responsive to the electrical signal to be indicated. In addition, a source of alternating voltage having a given first frequency is coupled to the resonant circuit. In the absence of an indicating signal the resonant circuit is tuned to a predetermined first frequency which provides the electroluminescent capacitor with a given light output. When an electrical signal is present, the resonant circuit is detuned from the aforesaid first frequency providing the electroluminescent capacitor with a light output proportional to the electrical signal.

The device of this invention utilizes the known phenomenon that the light emitted by an electro-luminescent capacitor is proportionally varied as the resonance frequency of the resonant circuit of which this capacitor forms part deviates from the frequency of the voltage source.

While the frequency of the voltage source may be chosen rather arbitrarily, it is preferably of the order of a few hundred kc./s.

An embodiment of the device according to the invention, in which an electric voltage signal is to be indicated, features part of the inductor of the resonant circuit being connected in parallel with an aforesaid reactive impedance comprising a capacitor having a dielectric with a dielectric constant which varies proportionally with the applied voltage signal as, for example, a dielectric of bariumtitanate or bariumstrontiumtitanate. For the indication of electric current signals, the inductor of the circuit may, in another similar embodiment, have connected with it, in series or in parallel, as the aforesaid reactive impedance an inductor with a magnetically saturable core, the winding of which carries the current signal.

In one embodiment, the resonant circuit is approximately tuned, in the absence of a current or voltage signal, as the case may be, to be indicated, to the frequency of the voltage source. In this instance, resonance, the capacitor has a maximum light output. When the electric signal of, as the case may be, voltage is applied, or current supplied, the circuit is detuned, i.e., falls out of resonance and the emitted quantity of light from the electroluminescent capacitor diminishes strongly. As an alternative, the elements may be proportioned so that, when the voltage signal is applied, or the current signal is supplied, the circuit approaches a resonant frequency equal to the frequency of the source, so that the light output increases. The maximum sensitivity is obtained by choosing the frequency of the alternating supply voltage so that the electro-luminescent capacitor, together with the other elements of the resonant circuit, is adjusted to the steepest part of the flank of the resonance curve, to wit, the peak thereof.

In order to increase the value of the resonant frequency of the resonant circuit, it can be connected in series with a preconnected impedance to the supply source. Alternatively, a different weak form of inductive or capacitative coupling may be used. Also, resonant circuits with parallel resonance or series resonance may be utilized in the present invention.

The above-mentioned features of this invention will become more apparent by reference to the following description taken in conjuncton wth the sole FIGURE of the accompanying drawing, in which:

One embodiment of a device according to the invention is illustrated schematically therein.

The electric signal, in the form of a voltage signal for the particular embodiment illustrated in the FIGURE and selected therein by way of example only to teach the principles of this invention, to be indicated is placed at the input terminals J and is supplied via a series-connected resistance R to the electrodes of the capacitor C. The resistor R serves to prevent the source (not shown) of the voltage signal applied to terminals J from exerting an excessively strong damping effect. The dielectric of this capacitor consists of bariumstrontiumtitanate, which, as is well known, has the property of having a dielectric constant varying proportionally with the voltage applied.

The capacitor C is connected in parallel, via a series-connected D.C. voltage source which is shown in the FIGURE as battery B, with a comparatively small part of the inductor L of a resonant circuit, which also comprises an electro-luminescent capacitor $C_{el}$ and a blocking capacitor $C_b$. The latter has a high capacity and serves only to avoid short-circuit of the D.C. voltage source across the inductor L. The dielectric of the capacitor $C_{el}$ may, as is known, consist of activated zinc sulphide powder, which is suspended in an insulating dielectric, for example, an organic synthetic substance or glass enamel.

The resonance frequency of the resonant circuit is determined mainly by the inductor L and the capacities of $C_{el}$ and C, the latter having a variable capacitance which proportionally varies with the voltage signal applied at the terminals J by virtue of the latter's aforesaid dielectric property. By proper selection of the amplitude of the voltage source B, the capacitance of capacitor C may be adjusted to provide the respective resonant circuit with a resonant frequency at a desired predetermined advantageous point of the associated frequency response characteristic curve.

The inductor L, in the example of the embodiment illustrated in the FIGURE is designed so that a tight coupling between the two parts prevails.

The resonant circuit is connected by way of a pre-connected inductor $L_v$, to an alternating-voltage generator G which provides an alternating voltage signal having a frequency G'. In the example of the illustrated embodiment, the resonant circuit is proportioned so that in the absence at terminals J of a voltage to be indicated, the resonant circuit is turned to, i.e., is at resonance or substantially resonance with, the frequency G' with the electro-luminescent capacitor $C_{el}$ having a predetermined light output, as, for example, a maximum brightness, at this frequency of resonance. When a voltage signal is applied to the terminals J, the resonant circuit is detuned, i.e. falls out of resonance, so that the light output of the electro-luminescent capacitor is proportionally varied as, for example, in the aforesaid case where the resonant circuit is tuned to provide $C_{el}$ with a maximum brightness at resonance, the capacitor $C_{el}$ proportionally emits a much smaller quantity of light.

In a typical application, the values of various elements, including those of the resonant circuit, are as follows: capacitor $C_{el}$: 200 pf. with a surface of about 1 cm.$^2$, voltage at the capacitor $C_{el}$ in the case of resonance: 100 v.; generator frequency 300 kc./s., inductor L about 1 mh.; capacity of the titanate capacitor C about $10^4$ pf. The latter capacitor may have an electrode surface of, for example, 5 cm.$^2$ and a thickness of the dielectric of $50\mu$. The resonant circuit quality Q may be about 50. The resistor R may be chosen with a value of 2000 ohms. With a ratio of tapping of 1:10 of the inductor L, the required switching voltage, i.e. the voltage required to reduce the light output to substantially zero, is of the order of a few volts.

It has been found preferable to provide the parts of the inductor L with a tap means having a tapping ratio such that the amplitude of the alternating voltage appearing across the capacitor C in conjunction with the amplitude of the voltage of battery B is limited to being, at a maximum, five times higher than the amplitude of the voltage applied at terminals J. In this case, the capacitance of capacitor C will still be able to be varied in a wide range.

The invention is particularly adaptable to transistor switching circuits as employed in computer systems, with the capacitor $C_{el}$ visually representing an information bit or some multiple thereof.

The invention is preferably utilized for indicating a slow varying electrical signal, for example, alternating voltage or current signals of low periodicity.

As is well known, the resonant circuit according to the FIGURE may resonate at a number of related harmonic frequencies, it being preferred, however, to operate the resonant circuit at the harmonic resonant frequency that provides an optimum output light characteristic for the capacitor $C_{el}$ during the overall operation of the device.

While I have described above examples of my invention in connection with specific apparatus, it is to be clearly understood that this description is made only by way of example and not as a limitation to the scope of my invention as set forth in the following accompanying claims.

As a matter of course, the device according to the invention is also suitable for indicating slowly varying voltages or currents, for example, alternating voltages of low periodicity.

I claim:
1. An electroluminescent device adapted for visual indication of an electrical signal comprising a resonant circuit having an electroluminescent capacitor, inductor means coupled to said electroluminescent capacitor, and variable reactive impedance means coupled to said inductor having an impedance characteristic responsive to said electrical signal, and a source of alternating voltage having a given first frequency coupled to said resonant circuit, said resonant circuit being tuned to a predetermined second frequency in the absence of said electrical signal to provide said electroluminescent capacitor with a given light output, and said resonant circuit being detuned from said second frequency in the presence of said electrical signal to provide said electroluminescent capacitor with a light output proportional to said electrical signal.

2. An electroluminescent device according to claim 1 wherein said given first frequency of said alternating voltage is substantially equal to said predetermined second frequency.

3. An electroluminescent device according to claim 1 wherein said electrical signal comprises a voltage signal, and said variable reactive impedance comprises a variable dielectric-constant capacitor having a dielectric with a dielectric constant proportional to the voltage of said signal.

4. An electroluminescent device according to claim 3 wherein said inductor further comprises a winding having tap means associated therewith, said tap means being coupled to said variable dielectric-constant capacitor having a tapping ratio sufficient to prevent the instantaneous voltage appearing across said variable dielectric capacitor from being greater than five times the voltage of said signal.

5. An electroluminescent device according to claim 3 further comprising a D.C. source of voltage having a low A.C. impedance serially connected to said variable dielectric-constant capacitor.

References Cited in the file of this patent

UNITED STATES PATENTS

| | | |
|---|---|---|
| 2,694,785 | Williams | Nov. 16, 1954 |
| 2,836,766 | Halsted | May 27, 1958 |
| 2,863,711 | Hurvitz | Dec. 9, 1958 |
| 2,873,380 | Kazan | Feb. 10, 1959 |